June 30, 1936.  J. L. BRUSCA  2,045,896
BEARING MOUNTING
Filed May 10, 1935
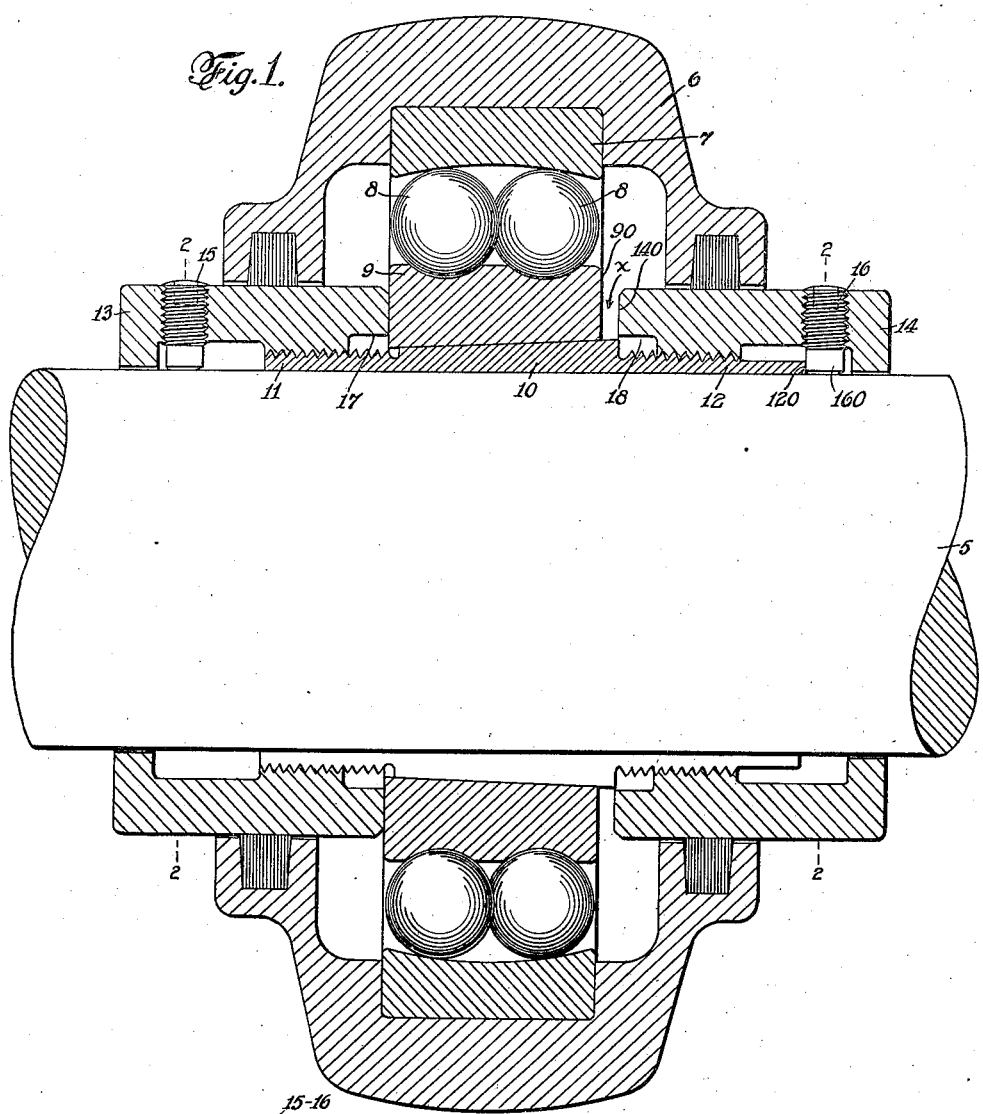
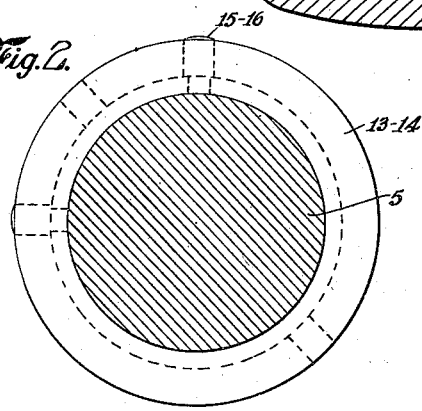
INVENTOR.
Joseph L. Brusca
BY
his ATTORNEY.

Patented June 30, 1936

2,045,896

UNITED STATES PATENT OFFICE 2,045,896

BEARING MOUNTING

Joseph L. Brusca, Philadelphia, Pa., assignor to S K F Industries, Inc., Philadelphia, Pa., a corporation of Delaware Application May 10, 1935, Serial No. 20,717

2 Claims. (Cl. 308—236)

The purpose of this invention is to provide an efficient and practicable arrangement for mounting on a shaft, and dismounting a bearing and a housing as a unit. My improved bearing mounting, in what I now regard as its preferred form might be termed an assembled unit comprising a bearing housing, there being a bearing formed with a taper bore mounted on a taper sleeve having screw threaded extensions at its ends on which are mounted interchangeable set nuts extending beyond the ends of the housing. The device is a self contained handling unit which may be moved about and shipped as such, and be placed in position on a shaft. When a shaft is located within the sleeve, the set nut at the smaller end of the taper is adapted to force the bearing up on the taper for locking it and the sleeve to the shaft, and the set nut at the larger end of the taper being adapted to force the bearing down the taper to unseat it. Set screws are preferably carried by the set nuts for holding each in its proper position in running conditions of the shaft, that is, with the first mentioned nut tight against the bearing for holding it on its seat and the unseating nut backed away from the adjacent end of the bearing.

The device can best be described in detail in connection with the accompanying drawing in which, Figure 1 shows a longitudinal section of the device, a broken away portion of a shaft being shown in elevation, and Figure 2 represents an end view taken at about the planes of the lines 2—2 at each end of Figure 1, looking outwardly.

In the usual merchandising position of the device, it will generally be in condition and adjustment for being mounted upon a shaft. In the drawing, the shaft 5 is represented in position, altho the shaft does not form a part of the device itself. The device is intended for use upon some sort of a shaft or arbor, one instance being a line shaft, the other parts of the device constitute an article of commerce capable of being merchandised as a self contained handling unit. This unit is adapted to receive a quantity of grease or other lubricant for the bearing which may serve as lubrication when the device is first put into use.

It is intended that this unit mounting may be placed upon a shaft which may be a line shaft such as is indicated in part at 5 and may be moved into a position so that the housing member 6 is in place to be attached to some support as for instance a hanger. Two locknuts 13 and 14 are shown at the respective sides of the housing and extending beyond the housing so that set screws 15 and 16 are accessible at all times, which permits the lock nuts to be turned without disturbing the position of the housing. The inner ring 7 of the bearing is preferably so mounted within the housing that it will locate the bearing axially and radially. The form of the bearing illustrated is a double row self-aligning bearing, having two rows of balls 8, running upon a spherical race way formed on the inside of the ring 7 and running in race way paths or grooves formed on the outer perimeter of the inner ring 9.

The bearing inner ring 9 is shown formed with a taper bore mounted on a taper sleeve 10 having two threaded, outwardly extending ends 11 and 12, the threads as shown being of the same pitch and diameter. The lock nut 13 has screw threaded engagement with the end 11 and the lock nut 14 has screw threaded engagement with the end 12.

The taper face of the sleeve at its smaller end is shown as being of slightly larger diameter than is the diameter of the crests of the adjacent screw thread. This taper face as shown may be described as projecting radially outwardly beyond the extending ends 11 and 12 and the screw threads formed upon them.

At this point it might be of advantage to call attention to the fact that in the form of the device illustrated, the lock nuts 13 and 14 are identical in form one with the other and consequently are interchangeable. After the unit has been slipped on to the shaft, the lock nut 13 at the smaller end of the taper sleeve is turned until it has tightened the bearing on the sleeve and on the shaft by forcing the bearing up on the taper sleeve 10. This sleeve preferably being split as shown is compressible and clamps the shaft in a well known manner. After this clamping has been completed, the set screw 15 is turned down until it engages the shaft sufficiently for preventing accidental turning of the nut 13. Then the lock nut 14 at the larger end of the taper, which is really a removal nut, is turned until the end 160 of the set screw 16 engages the end 120 of the threaded extending end 12 of the sleeve. This set screw 16 is then turned down for preventing accidental turning of the nut 14.

Attention is called to the fact that there is an appreciable space $x$ between the end 140 of the set nut 14 and the adjacent end 90 of the inner bearing ring 9. The purpose of the engagement between the ends 160 and 120 is to assure that this space is maintained, and avoid any possibility of the set nut 14 engaging the inner ring 9 of the bearing and forcing this down the taper sufficiently to release the parts from the shaft.

When it is desired to disassemble the structure the set screw 15 is backed off from the shaft and the nut 13 is backed away from engagement with the inner bearing ring 9 a short distance. Then the set screw 16 is preferably entirely removed from the nut 14 which nut is then screwed up until its end 140 engages the face 90 of the inner bearing ring and is then turned still further forcing the inner ring of the bearing down the taper of the sleeve 10, breaking the contacts and permitting the sleeve to free itself from the shaft 5. The nut 14 is shown as undercut at 18 to permit its end 140 to pass over the adjacent end of the taper sleeve 10 in unseating the bearing.

It is, of course, understood that the illustrative example of my invention herein described and shown in the drawing, while regarded at the present time as the preferred form, is nevertheless susceptible to change within the scope of the claims without departing from the spirit of my invention.

Having thus described my invention, I claim and desire to secure by Letters Patent:

1. In a device of the character specified, the combination with a bearing housing, of a sleeve having a taper bearing seat and outwardly extending screw threaded ends, a bearing located within the housing and having a taper bore mounted on the taper seat of the sleeve, interchangeable set nuts mounted on the screw threaded ends of the sleeve, the inner end of the nut being undercut to clear the bearing seat, and adapted to move the bore of the bearing over the said taper seat, and set screws carried by the respective set nuts at the undercut portion, the portion of each set nut carrying the set screw being located beyond the adjacent end of the housing.

2. In a device of the character specified, the combination with a bearing housing, of a sleeve having a taper bearing seat and outwardly extending screw threaded ends, a bearing located within the housing and having a taper bore mounted on the taper seat of the sleeve, interchangeable set nuts mounted on the screw threaded ends of the sleeve, the inner end of the nut being undercut to clear the bearing seat, and adapted to move the bore of the bearing over the said taper seat, and set screws carried by the respective set nuts at the undercut positions, the portion of each set nut carrying the set screw being located beyond the adjacent end of the housing, the sleeve at the larger end of the taper seat being extended beyond the threaded extension into a position to engage the inner end of the set screw carried by the set nut mounted on the last mentioned threaded extension for holding the bearing engaging portion of the said set nut out of contact with the bearing.

JOSEPH L. BRUSCA.